US006959586B2

(12) United States Patent
Watts et al.

(10) Patent No.: US 6,959,586 B2

(45) Date of Patent: Nov. 1, 2005

(54) EVALUATING DATA HANDLING DEVICES BY MEANS OF A MARKER IMPURITY

(75) Inventors: Ronald Lee Watts, Ft. Collins, CO (US); Kenneth J. Altshuler, Boulder, CO (US); John Douglas Deibert, Longmont, CO (US); Phillip S. Wilhelm, Longmont, CO (US); Jonathan E. Olson, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 584 days.

(21) Appl. No.: 09/998,040

(22) Filed: Nov. 30, 2001

(65) Prior Publication Data

US 2003/0103283 A1 Jun. 5, 2003

Related U.S. Application Data

(60) Provisional application No. 60/347,008, filed on Nov. 7, 2001.

(51) Int. Cl.[7] .................................................. G01M 3/04

(52) U.S. Cl. .......................................................... 73/40.7

(58) Field of Search ............................ 73/40.7, 37, 41, 73/45, 45.1, 45.2, 45.3, 45.4, 31.03, 431, 865.6

(56) References Cited

U.S. PATENT DOCUMENTS 4,418,369 A 11/1983 Applequist et al.
4,471,395 A 9/1984 Beck et al.
4,535,373 A 8/1985 Schuh
4,744,919 A * 5/1988 O'Holleran .................... 516/5
5,097,978 A 3/1992 Eckerd
5,109,304 A * 4/1992 Pederson ..................... 360/51
5,109,380 A * 4/1992 Ogino ......................... 714/26
5,138,871 A * 8/1992 Retta et al. .................... 73/38
5,270,887 A 12/1993 Edwards et al.
5,282,101 A 1/1994 Reinisch
5,381,701 A * 1/1995 Frankenthal et al. ....... 73/865.6
5,454,157 A 10/1995 Ananth et al.
5,521,776 A 5/1996 Mochizuki
5,671,103 A 9/1997 Tada
6,276,194 B1 8/2001 Vinton et al.
6,446,517 B1 * 9/2002 Sharma et al. ............. 73/865.6
6,675,119 B1 * 1/2004 Liu ............................ 702/121

FOREIGN PATENT DOCUMENTS

JP 05052713 A * 3/1993 .......... G01M/19/00

OTHER PUBLICATIONS

MIL–STD–810E Method 510.3 "Sand and Dust", Jul. 14, 1989, p. 179 of 461.*

ASTM Subcommittee, "Practice F1170–88(1993) Standard Practice For Determining The Performance of a Filter Medium Using Water and Siliceous Particles," Book of Standards, ASTM (West Conshohocken, PA), vol. 14 (No. 4), (.

Powder Technology, Inc., "History of Test Dust," Powder Technology, Inc. (Burnsville, MN).

Materials Bulletin, "PIT Environmental Test Method," IBM.

David Weatherbee, "Particulate Test," Product Assurance Engineering Report, Seagate Technology LLC only pp. 1, 2, 6, 9 & 10 received with figures 1, 2, 3, 4.

* cited by examiner

*Primary Examiner*—Charles Garber

(74) *Attorney, Agent, or Firm*—Fellers, Snider, et al.

(57) ABSTRACT

The present invention is a method for evaluating a multiplicity of data handling devices each having a sealed chamber with several interior surfaces. It uses an impurity chamber containing thousands of dispersed gas-borne particles that each contain a marker impurity that is substantially absent from all of the interior surfaces of at least one of the devices. That device is tested for vulnerability to external dust using the marker impurity.

27 Claims, 4 Drawing Sheets

EVALUATING DATA HANDLING DEVICES BY MEANS OF A MARKER IMPURITY

RELATED APPLICATIONS

The embodiments of the present invention claim the benefit of the filing date of the U.S. provisional patent application Ser. No. 60/347,008 filed Nov. 7, 2001.

FIELD OF THE INVENTION

This application relates generally to data handling devices and more particularly to evaluating the reliability thereof.

BACKGROUND OF THE INVENTION

Electromechanical data handling and storage devices can be susceptible to data loss or corruption due to external contaminants, or impurities, interfering with their operation. Typical devices well known in the industry include but are not limited to "Winchester" style disc drives, tape drives, and optical storage devices. Such devices use a magnetizable medium coated on a supporting substrate where information is written and stored coupled with a mechanism(s) used to write and or to retrieve that information stored on the medium. Such data handling devices commonly contain these components in addition to others within a chamber. These data handling devices are often designed with a variety of safeguards to help prevent impurities from coming into contact and damaging the magnetizable medium resulting in data loss. Such safeguards can include any one or combination of specialized materials, lubricants, filters, seals and pumps. However, these preventative solutions to guard against impurities have had only limited success.

Reliable data handling and storage is a critical parameter used to gage the successfulness of data handling devices. The implications of even minor data loss in data handling devices can be detrimental to the salability of that device in addition to further financial damage to a manufacturer's reputation due to frustrated end users. As a consequence, sample lots of these devices are generally tested in a variety of normal to accelerated functionality operations to measure their level of reliability. If damage occurs to either the magnetizable medium or the mechanism used to write or retrieve information, the device will have effectively lost data and in some circumstances, lost data in a specific and identifiable location. In some instances, environments are artificially generated containing dispersed impurities at a designed concentration to accelerate these types of data loss failures.

Dispersing commonly encountered impurities, often in the form of particulates, in concentrated levels around data handling devices have been used by people skilled in the art to help understand the data integrity relative to the impurities. Further, procedures have been created to test the effectiveness of data handling and storage in an artificially generated commonly encountered impurity rich environment. These procedures and tests can give insight as to how well the device can cope with the impurity used in order to enhance the design to safeguard around such an impurity. These procedures can also lead to testing of competitive devices in order to formulate a level of comparative performance.

Accelerated impurity enriched reliability testing of data handling devices can provide clues to the damage resistance of magnetizable medium or the components that transfer data thereon. There are a multitude of factors that dramatically change the robustness to particle type impurities inherent in the engineering designs of these devices, as touched upon earlier. There are also varied responses within the device due to particle type(s) and size(s). As a result, it is extremely difficult to decouple the positive and negative contributions of various designs and components when interacting with commonly encountered particulate impurities between data handling devices.

Among the designs and components that is currently difficult to figure out in data handling and storage devices is the ability to seal the device from these external particulate impurities. Most of these devices are designed to be sealed from particulate impurities external to the devices. By this it is meant that a sealed chamber herein is a chamber having a barrier, a gap in the chamber covered by a seal. A seal acts as a barrier capable of preventing the transfer of material, in this case a particle larger than the minimal acceptable size. A seal could include a gasket, filter, or simply a gap in the chamber below the minimal acceptable area. Because the current state of the art testing procedures have limited repeatability in terms of acceptably testing the true effectiveness of the seal of a device's chamber, an improved test that is far more decisive and informative is needed for the development of a more competitive and superior designed data handling and storage device.

SUMMARY OF THE INVENTION

The present invention is a method for evaluating a multiplicity of data handling devices each having a sealed chamber with several interior surfaces. It uses an impurity chamber containing thousands of dispersed gas-borne particles that each contain a marker impurity that is substantially absent from all of the interior surfaces of at least one of the devices. That device is tested for reliability using the marker impurity.

In a preferred embodiment, the device has a chamber part of which (the "cavity") is adjacent to a portion of the device's housing that includes an imperfect seal. The seal is exposed to an impurity chamber at a pressure higher than that of the cavity for at least a day. The multiplicity of devices is evaluated based on an indication of whether the marker impurity was present in the selected device(s) in an amount exceeding a predetermined threshold.

Additional features and benefits will become apparent upon reviewing the following figures and their accompanying detailed description.

DETAILED DESCRIPTION

Although the examples below show more than enough detail to allow those skilled in the art to practice the present invention, subject matter regarded as the invention is broader than any single example below. The scope of the present invention is distinctly defined, however, in the claims at the end of this document.

Numerous aspects of data storage device technology that are not a part of the present invention (or are well known in the art) are omitted for brevity, avoiding needless distractions from the essence of the present invention. For example, this document does not include much detail about methods for grinding or handling particulate materials or about performing effective SEM photography or spectral analysis. Also omitted are specific methods for materials selection, leak-testing or other aspects of data handling device manufacturing or operation.

Definitions and clarifications of certain terms are provided in conjunction with the descriptions below, all consistent with common usage in the art but some described with greater specificity. For example, "evaluating" a group is any process of assigning a quality indication, action selection, or similar text or numerical value to the group based upon a detected attribute of the group or a sample of it. A derived value is "based on" another value (the "original" value) if it can depend on the original value. More technically, such a derived value will depend on the original value for some values of other factors upon which the derived value depends. Note that the original value need not be prominent among such factors. A lamp's functionality is "based on" its power switch position, for example, even though this dependence is only manifested when the lamp is plugged in.)

When measuring a quantity that cannot be negative, such as an rate or similar quantification of an impurity, a threshold is "effectively zero" if the measurement mechanism cannot distinguish a measured level below the threshold from zero. Alternatively, an excessive level of an impurity present may be indicated in a manner that provides a significant margin of thousands of particles or more inside each selected device without indicating impurities exceed the allowable threshold. Moreover, an "excessive impurities" indication may correlate only crudely with an impurity amount. For example, the indication may result as an inference from an excessive number of new errors formed in a device as it operates.

A marker impurity is "substantially absent" from the interior surfaces of a device if the surfaces themselves are not made of a detectable amount of the impurity and if fewer than 50 particles containing a detectable amount of the material rest on the interior surfaces. For a self-cleaning, sealed device in which outgassing and particulate contamination are controlled, any material not used in manufacturing components of the device should be assumed to meet this condition.

Figure 1:
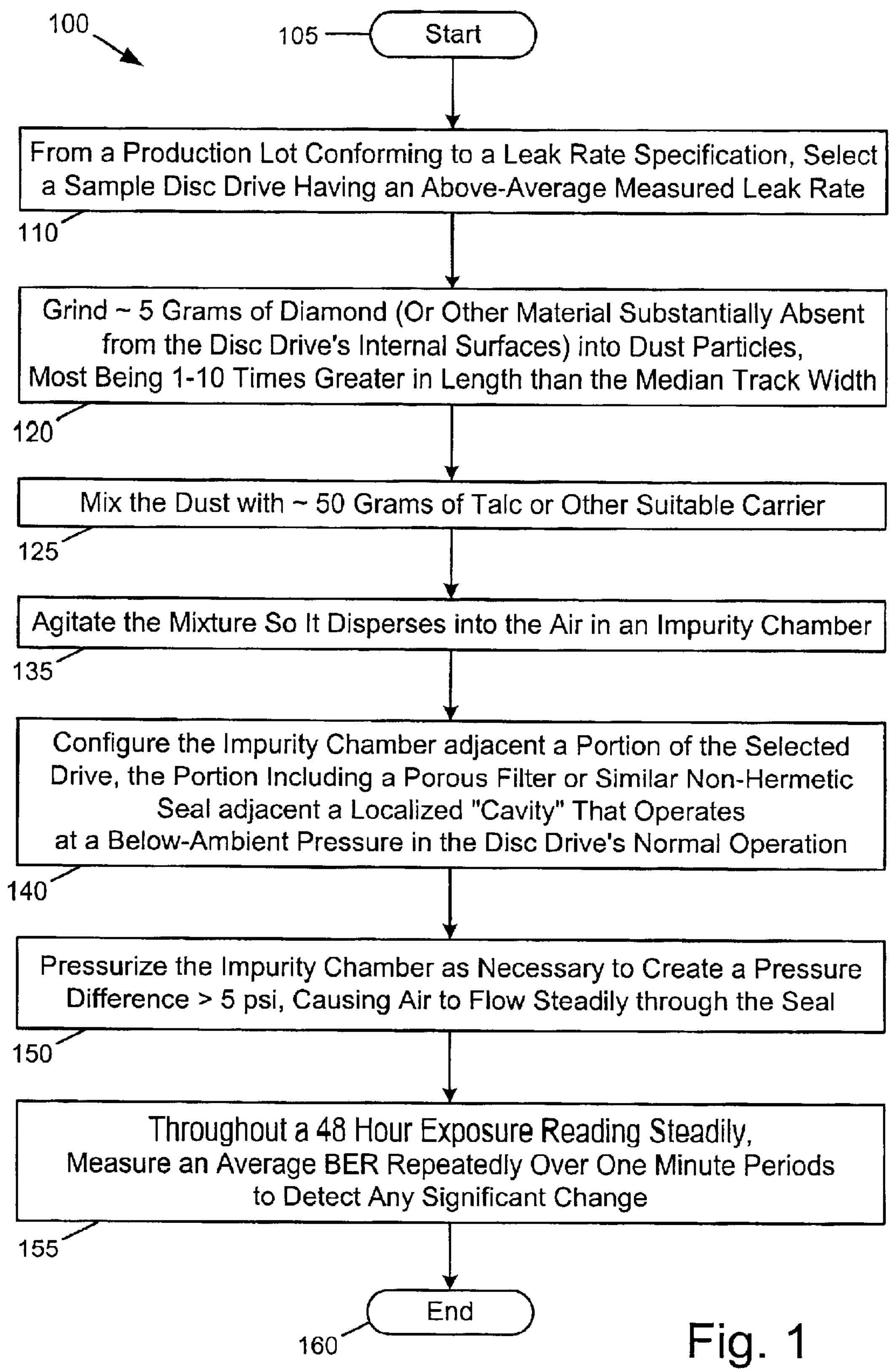
FIG. 1 shows a very detailed method embodiment of the present invention.

Turning now to FIG. 1, there is shown a very detailed method 100 of the present invention comprising steps 105 through 160. Some or all of a production lot of disc drives is sampled, and the samples are leak tested. The leak rate values within a predetermined specification are averaged, and a disc drive leaking faster than the average rate is selected 110. It should be emphasized that step 110 is optional, and that any similarly-manufactured set of devices sensitive to dust contamination can be selected in any way, so long as the selected set includes at least one cavity and an adjacent sealed housing portion. This point should be clear from the claims as granted, which articulate the metes and bounds of the present invention in its various characterizations.

Continuing the detailed method 100 of FIG. 1, about 5 grams of a material substantially absent from the disc drive's internal surfaces (e.g. diamond or molybdenum) is ground into dust particles, most being within an order of magnitude greater in length than the median track width (of the tracks in the disc drive) 120. (A particle's "length" or "diameter" refers to its largest dimension.) Most preferably, the "marker impurity" is a mixture of diamond particles, luminescent dye, and radium.

A particle that is very hard (i.e. at least 10% harder than a data storage coating surface material) such as diamond is desirable because it facilitates damage to a data storage medium, transducer head, or other parts that move in precise, close proximity. This damage is relatively easy to detect in many dust-sensitive devices, as will be appreciated by one of ordinary skill in the art. A luminescent or other dye having distinctive optical properties likewise facilitates detection by optical means, especially in a light-controlled environment. An element that is absent from all of the components in a disc drive is also desirable because it can be readily detected by a spectrum analyzer. Depending on the disc drive, suitable elements might include radium, cesium, rubidium, or any of the other comparably heavy elements having a distinctive spectral signature (as detectable by conventional Auger analysis). To reduce the amount of an expensive marker impurity needed for effective evaluation, the dust is then mixed with about 50 grams of talc or other suitable carrier 125. Preferably, the carrier is very coarse ground and has less than half of its particles small enough to enter the disc drive.

Next, the mixture is agitated so that some of it disperses into the air in an impurity chamber 135. The chamber is configured adjacent a portion of the selected drive that includes a seal adjacent a "cavity" that operates at a below-ambient pressure in the disc drive's normal operation 140. (Such a seal 346 is shown between an impurity chamber 330 and a cavity 350 in FIG. 3.)

Next, the impurity chamber is pressurized as necessary to create a pressure difference of at least 5 pounds per square inch, a pressure difference large enough to cause air to flow steadily through the seal 150. This flow rate is maintained throughout a 48 hour exposure period, reading steadily (for servo tracking, at least). At the same time, an average Bit Error Rate (BER) is repeatedly generated over a two day period or until a catastrophic failure, whichever comes first. Any significant changes are noted 155, as they can be used as an indication that the marker impurity is detected within the disc drive. For a marker impurity including diamond dust as described above, little calibration work will be necessary because failures will typically be catastrophic. (In other words, the impurity threshold for such a marker will be "effectively zero" because even a few hundred such particles of suitable size entering the drive will very probably cause one to come between each head and its media surface, causing catastrophic failure.)

Note that where a catastrophic error occurs, the time to failure can be used to estimate how much of the marker impurity was present at an earlier time. Suppose, for example, that roughly 20 milligrams of the impurity will cause such a failure. If two devices take 4 hours and 10 hours to fail, it may be estimated that they had 5 mg and 2 mg after the first hour of exposure, respectively. If the one-hour threshold is set at 3 mg, and if none of the sample devices is permitted to fail, this test outcome will cause the original lot to fail. (Note that for a test of this type, it might be desirable to select modified devices as samples, ones that are similar to the remainder of the production lot but with no recirculation filter.)

For less aggressive types of marker impurities usable in the present invention, a modest amount of experimentation will be necessary to effectively determine what should constitute a "significant change" in the monitored performance indicator. One of ordinary skill would recognize such a change without experimentation in most cases, however, and in any case this will not hinder one of ordinary skill in practicing the present invention.

Figure 2:
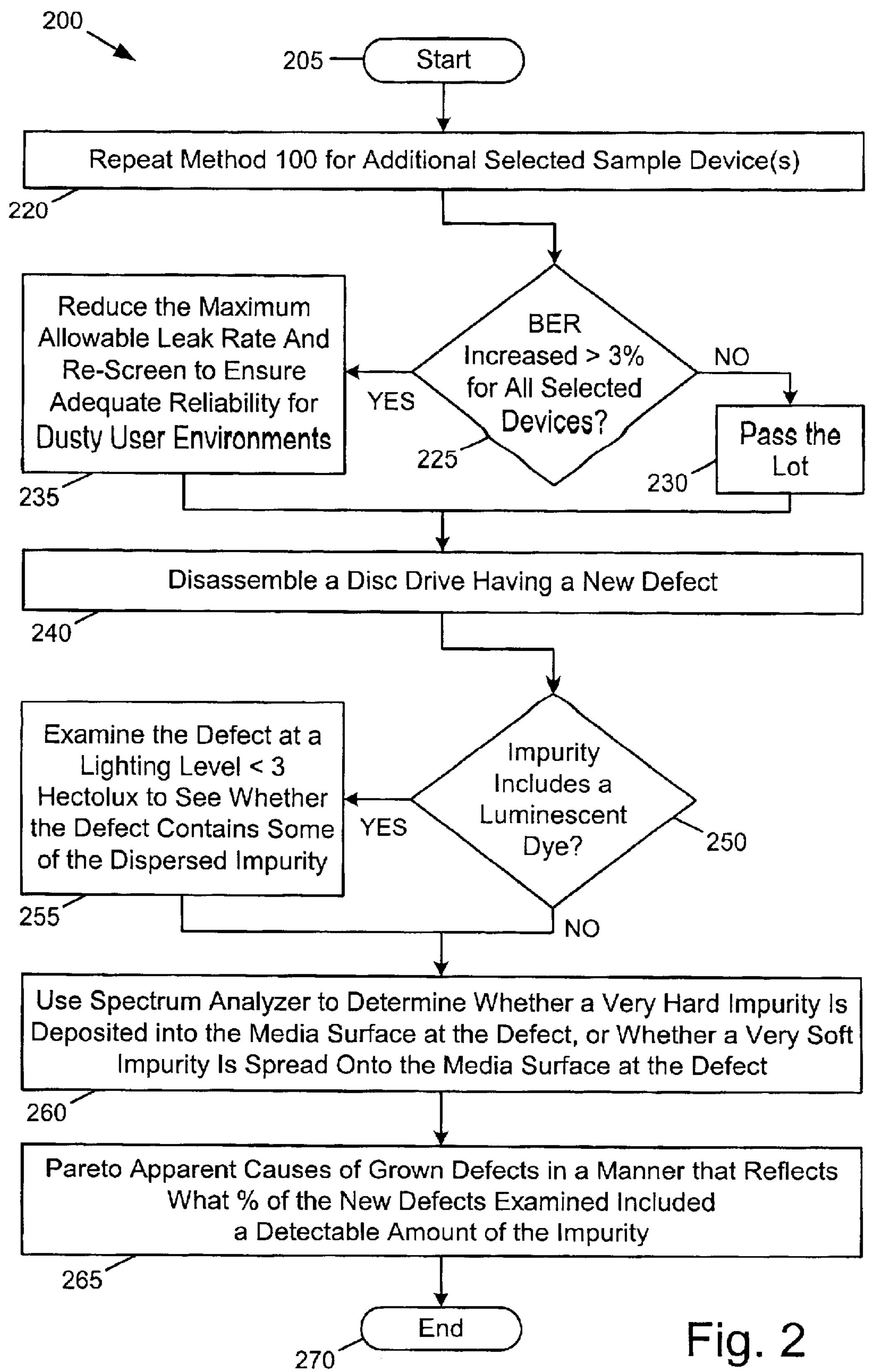
FIG. 2 shows an even more detailed method for using a single-device testing method like that of FIG. 1.

Turning now to FIG. 2, there is shown an even more detailed method 200 for using a single-device testing method like that of FIG. 1, comprising steps 205 through 270. The method 100 is repeated for one or more additional selected devices 220, in either sequential or simultaneous fashion. It is determined whether a monitored performance characteristic (e.g. BER) increases substantially for all selected devices 225. If so, the production lot is re-screened with a tightened leak rate specification 235. Otherwise, the lot is deemed to have passed 230.

In one of the disc drives under test, a new defect not present prior to the impurity chamber exposure will often be found. This may be manifested as a catastrophic error or as a "hard" (media) defect, for example. The disc drive is disassembled for analysis 240. If the marker impurity included a luminescent dye 250, the defect is examined visually under low light conditions 255. In any case, a spectrum analyzer can then be used to determine whether an impurity is present at the site of the detected defect 260. Note that the site is a failing transducer head, for catastrophic failures and many others.

After examining several new defects, it is possible to pareto their apparent causes. It is useful that the apparent cause for some new defects can be indicated as due to external dust or not, by use of the present method 200, with a high degree of confidence. At step 265, the percentage of the examined new defects found to contain the impurity is calculated and presented for this purpose.

Figure 3:
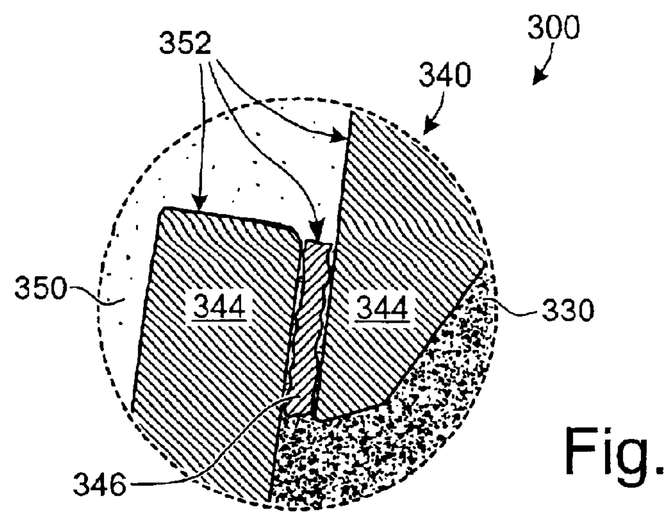
FIG. 3 shows a handling device having a housing with a sealed portion adjacent an impurity chamber, the portion including a porous filter or other imperfect seal.

Turning now to FIG. 3, there is shown a data handling device 300 having a housing with a sealed portion 340 comprising a porous filter or other imperfect seal 346 sealing two metal portions 344. An impurity chamber 330 containing an airborne marker impurity 330 is at a pressure higher than that of the cavity 350 of the device. (Note that the "cavity" is the region just inside the sealed portion 340, and that other portions of the device's interior may be at a higher pressure.) The pressure difference causes gas (and perhaps particles) to flow through the filter or seal 346. Note that the marker impurity is selected so as to be substantially absent from all of the interior surfaces 352 of the device prior to the exposure of the device to the impurity chamber 330.

Figure 4:
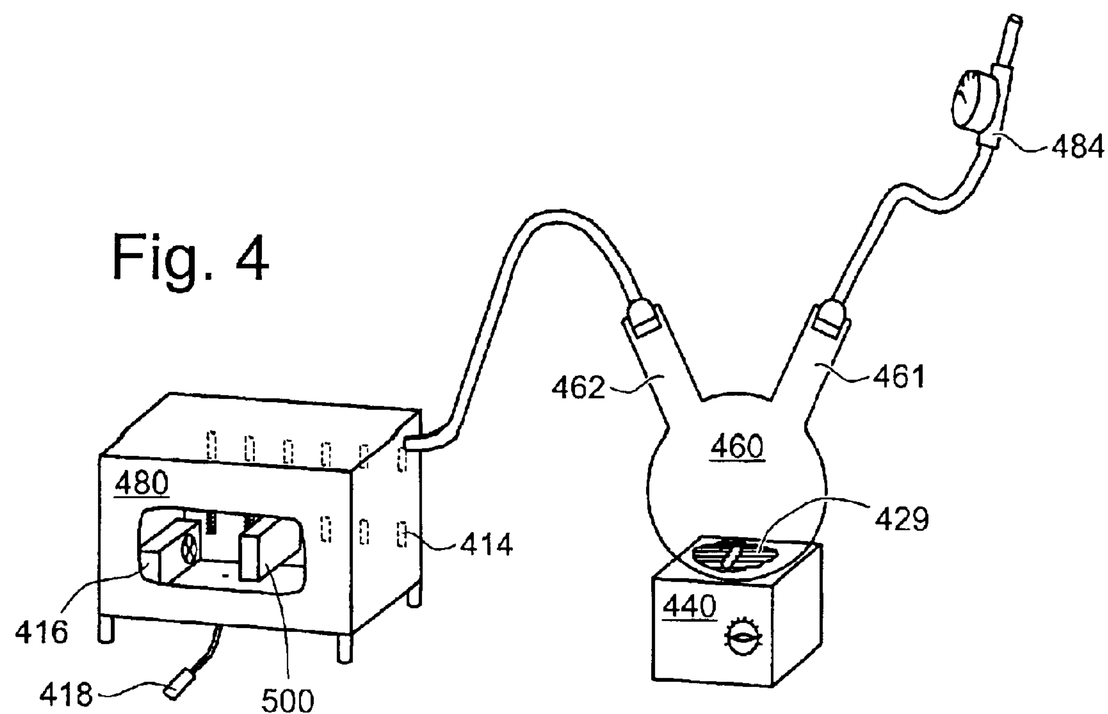
FIG. 4 shows a prototype apparatus suitable for performing a method like those of FIGS. 1&2.

FIG. 4 shows a prototype apparatus suitable for performing a method like those of FIGS. 1&2. An inlet 461 received filtered clean air through a pressure control valve 484 from an air compressor (not shown). Air then enters the mixing chamber 460, in which it receives dust 429 that is agitated by an iron plug that is part of a conventional magnetic stirrer 440. After mixing with the dust 429, the air moves into the impurity chamber 480. A recirculation fan 416 helps keep the dust suspended in the air in the impurity chamber 480 until the air leaves through exit filter 418. As a result of this apparatus and of the communication/power connectors 414, one or more disc drives 500 operate while almost completely immersed in dense airborne dust.

Figure 5:
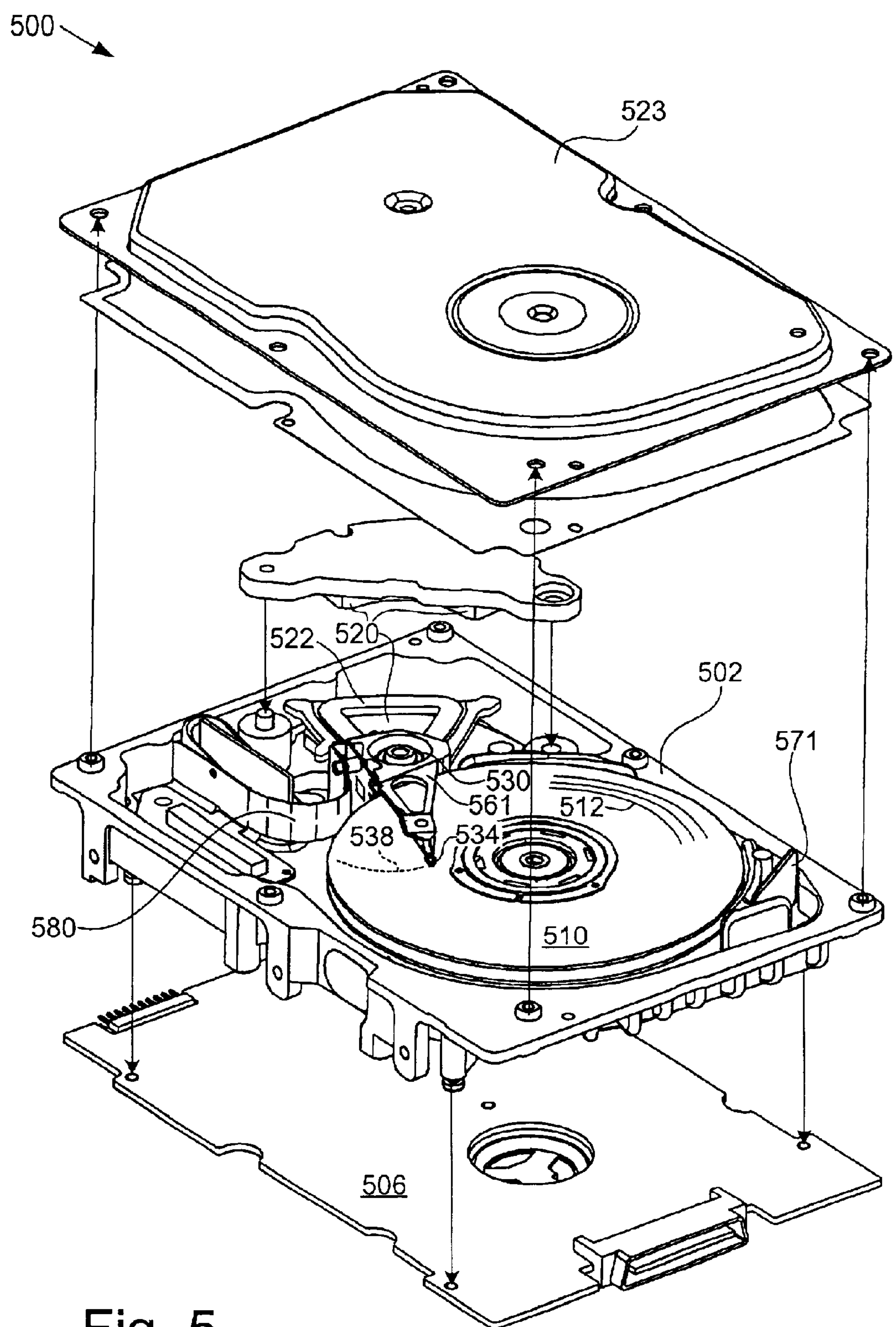
FIG. 5 shows a partially exploded view of the disc drive under test in FIG. 4.

FIG. 5 shows a partially exploded view of the disc drive 500 under test in FIG. 4. Disc drive 500 is a disc drive including base 502 to which various components are mounted. Top cover 523 cooperates with base 502 conventionally to form a sealed chamber. The components include a spindle motor which rotates data storage discs 510 at several thousand revolutions per minute. Information is written to and read from tracks 512 on discs 510 through the use of an actuator assembly 561, which rotates during a seek operation about a bearing shaft assembly 530 positioned adjacent discs 510. Actuator assembly 561 includes a plurality of actuator arms which extend above and below each disc 510, with one or more flexures extending from each of the actuator arms. Mounted at the distal end of each of the flexures is a transducer head 534 which includes an air-bearing slider enabling transducer head 534 to fly in close proximity above the corresponding surface of associated disc 510. Because of the low fly height and fine track widths, particles are removed from the chamber whenever the drive operates by use of a recirculation filter 571. As a response to damage by large particles, as detected by the present invention, one might desire to increase the density and reduce the porosity of the recirculation filter 571.

Servo and user data travels through transducer head 534 and flex cable 580 to control circuitry on controller board 506. Flex cable 580 maintains an electrical connection by flexing as transducer heads 534 traverse tracks 512 along their respective radial paths 538. By "radial," it is meant that path 538 is substantially aligned with a radius of the disc(s) 510, although their directions may be offset from a perfectly radial direction by up to about 20 degrees due to head skew, as is understood in the art.

During a seek operation, the overall track position of transducer heads 534 is controlled through the use of a voice coil motor (VCM), which typically includes a coil 522 fixedly attached to actuator assembly 561, as well as one or more permanent magnets 520 which establish a magnetic field in which coil 522 is immersed. The controlled application of current to coil 522 causes magnetic interaction between permanent magnets 520 and coil 522 so that coil 522 moves. As coil 522 moves, actuator assembly 561 pivots about bearing shaft assembly 530 and transducer heads 534 are caused to move across the surfaces of discs 561 between the inner diameter and outer diameter of the disc(s) 561. Fine control of the position of head 534 is optionally made with a microactuator (not shown) that operates between the head 534 and the actuator arm.

As will be appreciated by those of skill in the art, several portions of the chamber formed by baseplate 502 and cover 523 are imperfectly sealed. This provides many gaps through which particles having a length larger than the width of tracks 512 might enter. Track densities can be 100000 tracks per inch or higher in today's disc drives, making them vulnerable to exceedingly small particles that can come from any of several sources within the chamber or from the outside. The present invention provides a new and useful way to evaluate a new configuration and to help eliminate a reliability concern.

Alternatively characterized, a first embodiment of the present invention is a method (such as 100) to evaluate a multiplicity of data handling devices (such as 500) each having a sealed chamber (such as 300) with several interior surfaces (such as 352). At least one of the devices is selected (such as by step 110 or arbitrarily). An impurity chamber (such as 330,480) is provided (such as by step 135) containing thousands of dispersed gas-borne particles each containing a marker impurity that is substantially absent from all of the interior surfaces of the selected device(s). Preferably, a high quality marker impurity is provided in a mixture containing a carrier impurity generally comprising larger particles of a hardness similar to those of the marker impurity. When the mixture is agitated, some of the marker impurity disperses into the gas (such as by step 135) of the chamber.

A sealed portion of the selected data handling device(s) is exposed to the impurity chamber (such as by step 140). During this time, the cavity is maintained at a lower pressure than that of the impurity chamber (such as by step 150). The multiplicity of data handling devices is evaluated (such as by steps 225,230,235,265) based on an indication of whether the marker impurity is present in an amount exceeding a predetermined threshold (such as the "any significant change" indication of step 155).

In a second embodiment, the multiplicity of data handling devices can each store data in thousands of tracks (such as 512) written therein. The tracks define a median width W. Of those airborne particles of the marker impurity having a length greater than W, in this embodiment, at least 5% of them have a length less than 10 W (such as by step 120). This reduces an amount of the marker impurity needed to perform an effective evaluation.

In a third embodiment, the device selection is performed based on an outcome of the leak-testing step (such as by step 110). A range of marginal leak rates is identified that is broad enough so as to include at least one leak rate corresponding to one of the multiplicity of data handling devices. The range is then used to identify a subset of the data handling devices such that each identified device has a leak rate within the range, the identified device(s) being the selected device(s).

In a fourth embodiment, the sealed housing portion (such as 340) includes a porous filter (such as 346) positioned between the impurity chamber and the cavity (such as by step 140). The cavity, a localized portion of a chamber of a data handling device, is optionally constructed so that operating the device causes it to be partially evacuated. This causes the gas in the impurity chamber to flow (such as by step 150) from the impurity chamber (such as 330) through the porous filter into the cavity (such as 350). This flow, which can be as small as 1–10 cc's per day or smaller, is preferably sustained for a period of at least one day or until a catastrophic failure occurs (such as by step 155).

In a fifth embodiment, the marker impurity essentially consists of an ingredient selected so as to be at least 10% harder than a data storage surface of the tested device (such as by step 120) so that one of the airborne particles can damage and become lodged into the data storage surface (such as by step 260). With a very hard marker impurity such as molybdenum or diamond of suitable size, this damage will be significant enough to cause a dramatic operational change so that any of several indicators will change dramatically even a miniscule amount of the particulate impurity enters the device. Preferably, one or more test devices are exposed to the impurity, and an indicator is selected so as to evaluate the production lot as a failure only if the amount of the detected impurity inside the devices exceeds a predetermined threshold that is effectively zero (such as by step 235).

In a sixth embodiment, the marker impurity includes a luminescent material, and in which the examining step (d1) includes a step of maintaining a region adjacent the media surface at a lighting level of less than 3 hectolux to detect whether the luminescent material is present (such as by step 255). With suitable light and magnification, this can be performed by performed by viewing or photographing the media surface to detect whether the dye is present. Additionally, the chemical content of a media defect can be analyzed with a spectrum analyzer (such as by step 260) to verify that the defect contains some of the marker impurity.

All of the structures and methods described above will be understood to one of ordinary skill in the art, and would enable the practice of the present invention without undue experimentation. It is to be understood that even though numerous characteristics and advantages of various embodiments of the present invention have been set forth in the foregoing description, together with details of the structure and function of various embodiments of the invention, this disclosure is illustrative only. Changes may be made in the details, especially in matters of structure and arrangement of parts within the principles of the present invention to the full extent indicated by the broad general meaning of the terms in which the appended claims are expressed. For example, particles each containing a few ingredients can be used rather than pure particles, without departing from the scope and spirit of the present invention. In addition, although the preferred embodiments described herein are largely directed to disc drives, it will be appreciated by those skilled in the art that many teachings of the present invention can be applied to other dust-sensitive data handling devices such as tape drives without departing from the scope and spirit of the present invention.

What is claimed is:

1. A method for evaluating a multiplicity of data handling devices each having a sealed chamber with several interior surfaces, the method comprising steps of:

(a) selecting at least one of the multiplicity of data handling devices, the selected device(s) having a cavity and a sealed housing portion adjacent thereto by steps comprising:
  leak-testing at least some of the multiplicity of data handling devices; and
  finalizing the selection step by selecting the at least one device based on an outcome of the leak-testing step, the finalizing step comprising:
    identifying a range of marginal leak rates broadly enough so as to include at least one leak rate corresponding to one of the multiplicity of data handling devices; and
    identifying a subset of the data handling devices such that each identified device has a leak rate within the identified range, the identified device(s) being the selected device(s); and (b) providing an impurity chamber at a first pressure and containing thousands of dispersed gas-borne particles that each contain a marker impurity that is substantially absent from all of the interior surfaces of the selected device(s);

(c) exposing the sealed portion of the selected data handling device(s) to the impurity chamber while maintaining a pressure of the cavity at a second pressure lower than the first pressure; and (d) evaluating the multiplicity of data handling devices based on an indication of whether the marker impurity was present in the selected device(s) in an amount exceeding a predetermined threshold.

2. The method of claim 1 in which the providing step (b) includes steps of:

(b1) providing a mixture comprising the marker impurity and a carrier impurity;

(b2) agitating the mixture to disperse the marker impurity into a gas.

3. The method of claim 2 in which the marker impurity is diamond dust and in which the providing step (b1) includes a step of mixing a mass M of diamond dust with a larger mass >9M of talc.

4. The method of claim 2 in which the multiplicity of data handling devices can each store data in thousands of tracks written therein, the tracks having a median width W, a subset of the thousands of particles each having a length greater than W, at least 5% of the particles in the subset having a length less than 10W so as to reduce an amount of the marker impurity needed to perform the evaluation step (d) effectively.

5. The method of claim 1 in which the multiplicity of data handling devices can each store data in thousands of tracks written therein, the tracks having a median with W, a subset of the thousands of particles each having a length greater than W, at least 5% of the particles in the subset having a length less than 10W so as to reduced an amount of the e marker impurity needed to perform the evaluating step (d) effectively.

6. The method of claim 5 in which the evaluating step (d) is performed by generating an indication of how well the selected device(s) performed after the exposing step (c) began.

7. The method of claim 1 in which the evaluating step (d) comprises steps of:

(d1) selecting a lower leak threshold rate if the impurity indication is positive, and otherwise selecting a higher leak threshold rate (i.e. higher than the "lower leak threshold rate); and (d2) performing a leak test on some of the multiplicity of data handling devices using the leak threshold rate selected in the step (d1).

8. The method of claim 1 in which the cavity is a localized portion of a device housing interior bounded by the interior surfaces, and in which the exposing step (c) includes a step (c1) of operating the selected data handling device(s) so that the localized portion is partially evacuated.

9. The method of claim 1 in which the evaluating step (d) includes a step (d1) of failing the multiplicity of data handling devices if the amount of the impurity is estimated to exceed the predetermined threshold and otherwise passing the multiplicity of data handling devices, the predetermined threshold being effectively zero.

10. The method of claim 9 in which the marker impurity provided in the providing step (b) is at least 10% harder than a data storage media surface inside the sealed chamber, and in which the exposing step (c) results in a portion of the marker impurity being deposited into the data storage media surface.

11. The method of claim 1 in which the marker impurity provided in the providing step (b) is at least 10% harder than a data storage media surface inside the sealed chamber, and in which the exposing step (c) results in a portion of the marker impurity being deposited into the data storage media surface.

12. The method of claim 1 in which the marker impurity provided in the providing step (b) is at least 10% softer than a data storage media surface inside the sealed chamber, and in which the exposing step (c) results in a portion of the marker impurity being deposited onto the data storage media surface.

13. The method of claim 12 in which the evaluating step (d) includes a step (d1) of optically examining the media defect to verify that the defect contains some of the marker impurity.

14. The method of claim 13 in which the marker impurity includes a luminescent material, and in which the examining step (d1) includes a step of maintaining a region adjacent the media surface at a lighting level of less than 3 hectolux to detect whether the luminescent material is present.

15. The method of claim 13 in which the marker impurity includes a dye, an in which the examining step (d1) is performed by viewing the media surface to detect whether the dye is present.

16. The method of claim 1 in which the marker impurity provided in the providing step (b) is selected so as to be harder than a data storage surface of the tested device so that one of the airborne particles can damage and become lodged into the data storage surface.

17. The method of claim 1 in which the evaluating step (d) includes a step (d1) of analyzing the chemical content of a media defect with a spectrum analyzer to verify that the defect contains some of the marker impurity.

18. The method of claim 1 in which the evaluating step (d) is performed by generating an indication of how well the selected device(s) performed after the exposing step (c) began.

19. The method of claim 18 in which the evaluating step (d) includes a step (d1) of monitoring an average bit error rate (BER) during the exposing step (c) to determine whether a significant BER change occurs.

20. The method of claim 19 in which the evaluating step (d) further includes steps of:

(d2) for a given one of the selected device(s), determining whether the BER over a predetermined interval grows by at least 3%, the predetermined interval being at least 10 seconds;

(d3) repeating the determining step (d2) for at least one more of the selected device(s); and (d4) generating a less favorable evaluation if the steps (d2) and (d3) each result in a measured BER increase, and otherwise generally generating a more favorable evaluation (i.e. more than the "less favorable" evaluation).

21. A method for evaluating a multiplicity of data handling devices each having a sealed chamber with several interior surfaces, the method comprising steps of:

(a) providing an impurity chamber containing thousands of dispersed gas-borne particles that each contain a marker impurity that is substantially absent from all of the interior surfaces of a tested one of the multiplicity of devices and is harder than a data storage surface of the tested device so that one of the airborne particles can damage and become lodged into the storage surface; and (b) a step for evaluating the multiplicity of data handling devices using the marker impurity.

22. The method of claim 21 in which the providing step (a) includes steps of:

(b1) providing a mixture comprising the marker impurity and a carrier impurity;

(b2) agitating the mixture to disperse the marker impurity into a gas.

23. The method of claim 21 in which the step for evaluating includes steps of:

(b1) operating the tested device so that a localized portion of the chamber thereof is partially evacuated, the localized portion being adjacent to an imperfectly sealed wall of the tested device; and (b2) exposing the imperfectly sealed wall of the tested device to the impurity chamber.

24. A method for evaluating a multiplicity of data handling devices each having a sealed chamber with several interior surfaces, the method comprising steps of:

selecting at least one of the multiplicity of data handling devices, the selected device(s) having a cavity and a sealed housing portion adjacent thereto;

providing an impurity chamber at a first pressure and containing thousands of dispersed gas-borne particles that each contain a marker impurity that is substantially absent from all of the interior surfaces of the selected device(s) and is harder than a data storage surface of the selected device(s) so that one of the particles can damage the data storage surface;

exposing the sealed portion of the selected data handling device(s) to the impurity chamber while maintaining a pressure of the cavity at a second pressure lower than the first pressure; and evaluating the multiplicity of data handling devices based on an indication of whether the marker impurity was present in the selected device(s) in an amount exceeding a predetermined threshold.

25. The method of claim 24 wherein the providing step comprises providing a marker impurity that is at least 10% harder than the data storage surface.

26. The method of claim 24 wherein the providing step comprises providing a marker impurity comprising diamond dust.

27. The method of claim 24 wherein the providing step comprises providing a mixture comprising the marker impurity and a carrier impurity.

* * * * *